Figure 3:
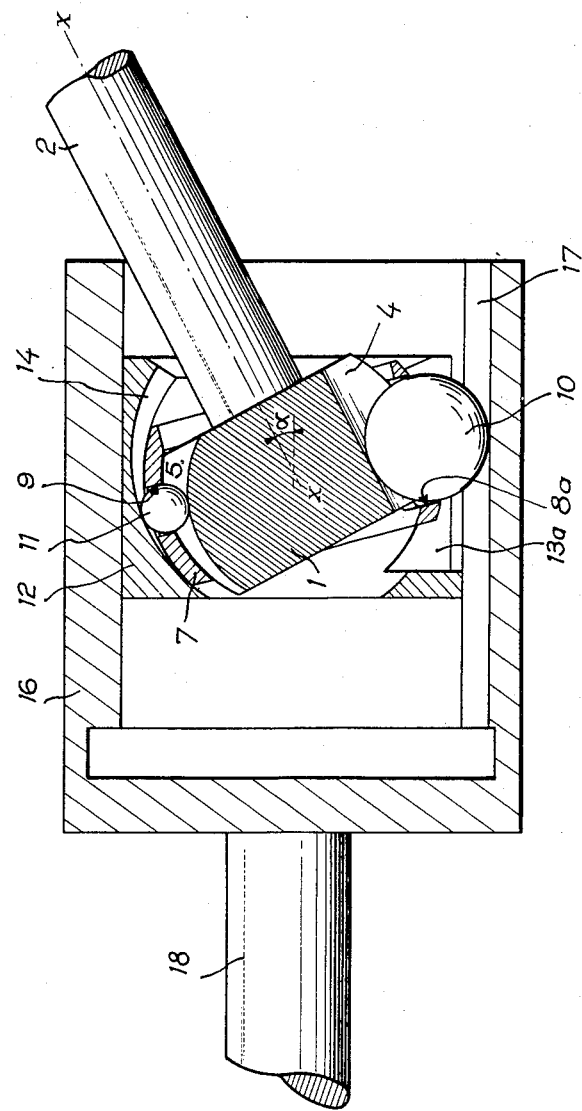

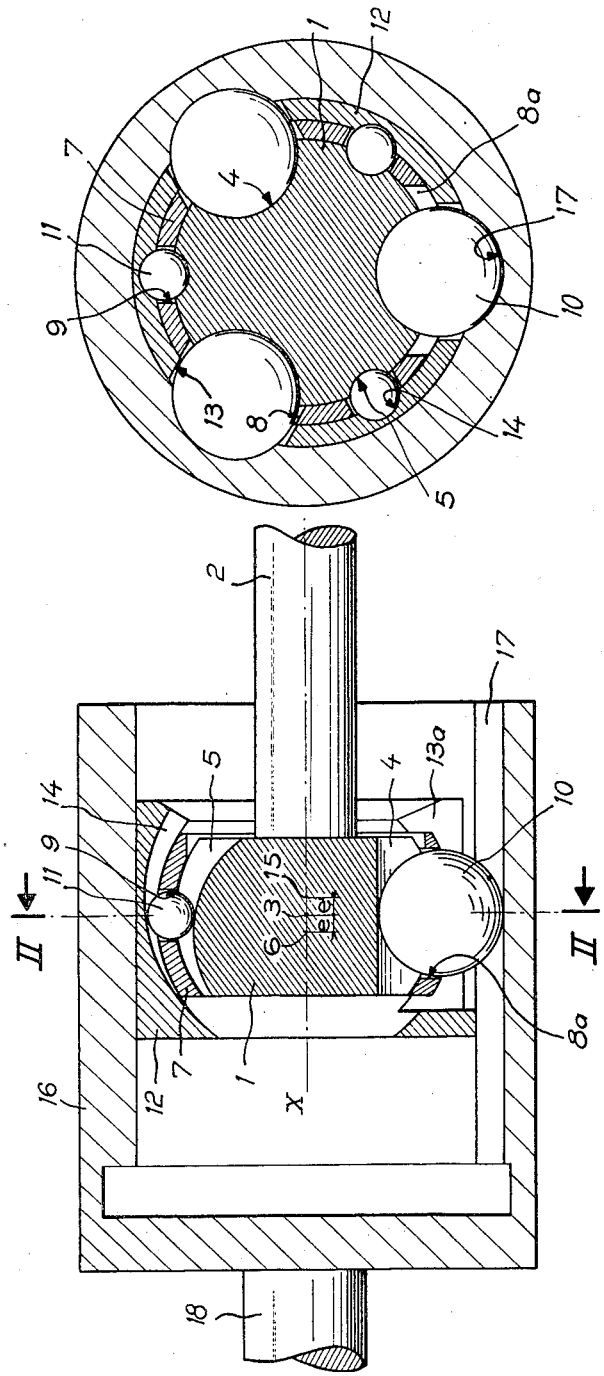

March 1, 1966 E. HENRY-BIABAUD 3,237,429
SLIDING UNIVERSAL JOINT
Filed March 31, 1964 2 Sheets-Sheet 2

United States Patent Office 3,237,429
Patented Mar. 1, 1966

3,237,429
SLIDING UNIVERSAL JOINT
Edmond Henry-Biabaud, Paris, France, assignor to Societe Anonyme Andre Citroën, Paris, France, a French society
Filed Mar. 31, 1964, Ser. No. 356,192
Claims priority, application France, Apr. 3, 1963, 930,234
3 Claims. (Cl. 64—8)

The present invention relates to a sliding universal joint which is homokinetic.

In accordance with an aspect of the invention, a sliding homokinetic universal joint comprises driving and driven elements having cylindrical grooves and being connected by means of first balls engraved in said grooves, said first balls being guided by means of a ball race which is in turn guided by second balls engaged in toric grooves, the centers of which are off-set.

The joint may comprise a knuckle which is at least partially externally spherical and connected to either the driving or driven shaft, said knuckle having cylindrical and troic grooves in which are respectively engaged said first balls and said second balls, a ball race, the external and internal surfaces of which are at least partially spherical and which is pivotally mounted on said knuckle, a bush, the internal surface of which is at least partially spherical and which is pivotally mounted on the ball race, said bush being provided with apertures for the passage of the first balls and with toric grooves in which the second balls are engaged and a sheath in which said bush is slidably mounted and which is connected to the other shaft, said sheath being provided with cylindrical grooves in which the first balls are engaged.

In order that the invention may be more clearly understood, reference will now be made to the accompanying drawings which show one embodiment thereof by way of example, and in which:

FIGURE 1 is an axial section through the joint,
FIGURE 2 is a transverse section thereof along the line II—II of FIGURE 1, and
FIGURE 3 is a view similar to that of FIGURE 1, but with the driving and driven shafts being at an angle.

As shown in the drawings, a joint according to the invention comprises a knuckle 1 to which is secured a shaft 2 which may be the driving or driven shaft. The knuckle 1 is externally spherically shaped and has its center at 3 on the axis X—X of the shaft, and is limited by two planes perpendicular to the axis X—X. The knuckle 1 has three cylindrical grooves 4 in the example shown, but this number may vary. The axes of the grooves 4 are parallel to the axis X—X. The knuckle 1 also has troci grooves 5 which have their centers at 6 on the axis X—X, and their eccentricity with respect to the knuckle 1 being denoted by $e$.

About the knuckle 1 is pivotally mounted a ball race 7 which is internally and externally limited by spherical surfaces having their centers at 3, and laterally by two parallel plates. This ball race has three apertures 8 and three apertures 9 in the same transverse plane. In each of the apertures 8 there is lodged a driving ball 10 engaged in one of the cylindrical grooves 4, and in each of the apertures 9 there is lodged a guiding ball 11 engaged in one of the toric grooves 5. The apertures 8 and 9 have, in planes of FIGURE 1, widths substantially equal to the respective diameters of the balls, which they carry without stress or excessive play, but these apertures are furthermore of sufficient length in the plane of FIGURE 2 to ensure clearance of the balls during operation. One of the apertures 8 may be extended as is seen at 8a on FIGURE 2 in order to simplify assembly of the ball race 7 on the knuckle 1, its width remaining substantially equal to the diameter of the ball 10.

About the ball race 7 is pivotally mounted a bush 12 which is internally spherically shaped, having its center at 3, and externally cylindrically shaped. This bush has three apertures 13 for the passage of the balls 10, one of the apertures being open on one of its lateral surfaces, as shown at 13a in order to permit assembly. It is furthermore provided with three toric grooves 14 in which the balls 11 are engaged and which have their centers at 15 on the axis X—X with an eccentricity $e^1$ equal but opposite to the eccentricity $e$. Finally the bush 12 is slidably mounted in a sheath 16, the internal surface of which is cylindrical and which has three parallel cylindrical grooves 17. This sheath is integral with a second shaft 18 which may be a driven or driving shaft, depending on the function of the shaft 2.

As can be seen in FIGURE 2, the radii of curvature of the cylindrical grooves 4 and 17 are equal to the radius of the balls 10. In the same manner, the radii of curvature of the troic grooves 5 and 14 are very slightly greater than the radius of the balls 11 in such a manner as to ensure that these are well enclosed. Furthermore the radii of the balls are determined in such a manner that said balls are simultaneously tangential to the grooves in which they are engaged.

When the axis X—X of the shaft 2 pivots about an angle $\alpha$ (FIGURE 3) the ball race 7 pivots about an angle $\alpha/2$, the balls 10 rolling without simultaneously sliding in the grooves 4 and the grooves 17. Furthermore the balls 11 in roll without sliding in the grooves 5 and 14 and, due to the equal eccentricity in opposite directions of said grooves, remain tangential thereto.

Since the balls 10 are simultaneously engaged in grooves 17 of the sheath 16 integral with the shaft 18 and in the grooves 4 of the knuckle 1 integral with the shaft 2, if the shaft 18 for example rotates by an angle $dw$, the shaft 2 will rotate by the same angle $dw$, whatever the angle formed by the axes of the shaft. The joint which has been described is thus strictly homokinetic.

It will be understood that the invention is not limited to the embodiment herein described but is susceptible to modification.

I claim:
1. A sliding homokinetic universal sliding joint comprising a driving element, a driven element, said elements being cylindrically grooved, a bush member slidable in one of said elements, said bush member and the other of said elements having toric grooves with off-set centers, first ball means connecting said elements and being engaged in said cylindrical grooves, a ball race disposed between said bush member and said other element for guiding said first ball means, and second balls means for guiding said ball race, said second ball means being engaged in said toric grooves.

2. A sliding homokinetic universal joint comprising a knuckle which is at least partially externally spherical, a driving shaft, a driven shaft, said knuckle being connected to one of said driving shaft and said driven shaft, said knuckle being both cylindrically grooved and torically grooved, first ball means engaged in said cylindrical grooves, second ball means engaged in said troic grooves, a ball race, the external and internal surfaces of which are at least partially spherical, and which is pivotally mounted on said knuckle, a bush, the internal surface of which bush is at least partially spherical and which is pivotally mounted on said ball race, said bush being apertured for the passage of said first ball means, and torically grooved to receive said second ball means, a sheath in which said bush is slidably mounted, said bush being connected to the other one of said driving and said driven shaft, and said sheath being cylindrically grooved to receive said first ball means.

3. A joint as set forth in claim 2, wherein the radii of curvature of said grooves are approximately equal to the radii of the ball means engaged therewith.

References Cited by the Examiner

UNITED STATES PATENTS

| | | | |
|---|---|---|---|
| 2,908,151 | 10/1959 | Wahlmark | 64—21 |
| 3,106,077 | 10/1963 | Sharp | 64—8 |
| 3,151,473 | 1/1964 | Cull | 64—8 |
| 3,176,476 | 4/1965 | Cull | 64—8 |

BROUGHTON G. DURHAM, *Primary Examiner.*

HALL C. COE, *Examiner.*